US008849560B2

(12) United States Patent
Stefani et al.

(10) Patent No.: US 8,849,560 B2
(45) Date of Patent: Sep. 30, 2014

(54) METHOD AND APPARATUS FOR CUSTOMER/PASSENGER WAYFINDING USING BOARDING PASS BARCODE SCANNING CAPABILITIES ON LOW-COST DISPLAY DEVICES

(75) Inventors: Rolf R. Stefani, West River, MD (US); James Gary Cooper, Jr., Annapolis, MD (US)

(73) Assignee: ARINC Incorporated, Annapolis, MD (US)

( * ) Notice: Subject to any disclaimer, the term of this patent is extended or adjusted under 35 U.S.C. 154(b) by 819 days.

(21) Appl. No.: 13/097,718

(22) Filed: Apr. 29, 2011

(65) Prior Publication Data
US 2011/0288768 A1 Nov. 24, 2011

Related U.S. Application Data

(63) Continuation-in-part of application No. 12/982,076, filed on Dec. 30, 2010, now Pat. No. 8,554,862.

(60) Provisional application No. 61/346,264, filed on May 19, 2010, provisional application No. 61/430,340, filed on Jan. 6, 2011.

(51) Int. Cl.
*G01C 21/00* (2006.01)
*G06Q 50/30* (2012.01)
(Continued)

(52) U.S. Cl.
CPC .............. *G06Q 50/30* (2013.01); *G01C 21/36* (2013.01); *G01C 21/26* (2013.01);
(Continued)

(58) Field of Classification Search
CPC .... G01C 21/26; G01C 21/3446; G01C 21/32; G01C 21/36; G08G 1/096827
USPC .................. 700/213; 382/181, 101, 143, 141; 209/584, 900; 701/400, 408, 409, 410, 701/411, 412, 413, 532; 198/346.1, 349; 235/454, 494, 487; 381/100
See application file for complete search history.

(56) References Cited

U.S. PATENT DOCUMENTS 6,778,683 B1 * 8/2004 Bonner et al. ................. 382/101
7,164,413 B2 * 1/2007 Davis et al. .................... 345/163
(Continued)

FOREIGN PATENT DOCUMENTS

JP 2002163691 A 6/2002
JP 2003187273 A 7/2003

OTHER PUBLICATIONS

Search Report in Connection with Related Application No. GB1108326.8.

*Primary Examiner* — Behrang Badii
(74) *Attorney, Agent, or Firm* — Ronald E. Prass, Jr.; Prass LLP

(57) ABSTRACT

A low-cost display unit that displays wayfinding information to a traveler in a public travel-related area is disclosed and may include a communication interface that facilitates receiving of travel-related information, a machine-readable marking reader that determines the presence of a travel document having one or more machine readable markings, scans the one or more machine-readable markings, and decodes the scanned one or more machine-readable markings, wherein the one or more machine-readable markings contain encoded traveled-related information pertaining to the traveler; and a display control unit that receives the decoded one or more machine-readable marking, determines the traveler's destination in the public travel-related area from the decoded one or more machine-readable markings, determines the path that the traveler should travel to reach the destination, and displays the determined path to the traveler on the low-cost display unit.

23 Claims, 12 Drawing Sheets

(51) Int. Cl.
*G06Q 30/02* (2012.01)
*G06Q 90/00* (2006.01)
*G01C 21/36* (2006.01)
*G01C 21/26* (2006.01)
*G08G 1/0968* (2006.01)
*G01C 21/34* (2006.01)

(52) U.S. Cl.
CPC ...... *G08G 1/096827* (2013.01); *G01C 21/3446* (2013.01); *G06Q 30/0281* (2013.01); *G06Q 90/20* (2013.01)
USPC ............ 701/400; 701/410; 701/409; 701/408

(56) References Cited

U.S. PATENT DOCUMENTS

| | | |
|---|---|---|
| 7,243,024 B2 | 7/2007 | Endicott |
| 2003/0033079 A1 | 2/2003 | Endicott |
| 2004/0034466 A1 | 2/2004 | Hood |
| 2004/0175038 A1* | 9/2004 | Bonner et al. ............... 382/181 |
| 2005/0078088 A1* | 4/2005 | Davis et al. ................. 345/163 |
| 2007/0030152 A1 | 2/2007 | Sprague |
| 2007/0109266 A1* | 5/2007 | Davis et al. ................. 345/163 |
| 2008/0318591 A1 | 12/2008 | Oliver |
| 2010/0063724 A1 | 3/2010 | Arnaud et al. |
| 2011/0118971 A1* | 5/2011 | Petzold et al. ............... 701/200 |
| 2012/0024953 A1* | 2/2012 | Fan et al. ..................... 235/454 |

* cited by examiner

METHOD AND APPARATUS FOR CUSTOMER/PASSENGER WAYFINDING USING BOARDING PASS BARCODE SCANNING CAPABILITIES ON LOW-COST DISPLAY DEVICES

PRIORITY INFORMATION

This non-provisional application is a Continuation-in-Part of U.S. patent application Ser. No. 12/982,076, filed Dec. 30, 2010, published as U.S. Patent Application Publication No. 2011/0093558 A1 on Apr. 21, 2011, entitled "METHOD AND APPARATUS FOR THE COLLECTION, FORMATTING, DISSEMINATION, AND DISPLAY OF TRAVEL-RELATED INFORMATION ON A LOW-COST DISPLAY BANK," which claims priority from U.S. Provisional Patent Application No. 61/346,264, filed May 19, 2010, entitled "SMART LOW-COST DISPLAY DEVICES," and claims priority to U.S. Provisional Patent Application No. 61/430,340, filed Jan. 6, 2011, entitled "METHOD AND APPARATUS FOR CUSTOMER/PASSENGER SPECIFIC INTERACTIVE FLIGHT INFORMATION DATA NOTIFICATION AND WAY-FINDING USING BOARDING PASS BARCODE SCANNING CAPABILITIES ON LOW-COST DISPLAY DEVICES," the content-contents of which are incorporated herein by reference in their entireties. This application is also related to U.S. patent application Ser. No. 13/097,665, filed Apr. 29, 2011, the same day as this application, issued as U.S. Pat. No. 8,496,164 on Jul. 30, 2013, entitled "METHOD AND APPARATUS FOR CUSTOMER/PASSENGER SPECIFIC INTERACTIVE FLIGHT INFORMATION DATA NOTIFICATION USING BOARDING PASS BARCODE SCANNING CAPABILITIES ON LOW-COST DISPLAY DEVICES," the content of which is incorporated herein by reference in its entirety.

BACKGROUND OF THE DISCLOSED EMBODIMENTS

1. Field of the Disclosed Embodiments

The disclosed embodiments relate to customer/passenger specific interactive flight information data notification using boarding pass barcode scanning capabilities on low-cost display devices.

2. Introduction

Flight Information Displays (FIDS) are widely used in society today. The two basic types of FIDS displays are 1) multiple display or monitor groups forming banks or arrays of displays each showing a static image of a specified number of flight entries, and, 2) single display/monitor installations which scroll through a number of pages/images to accommodate numbers of pages required to ultimately show all flights for a specific facility/configuration.

The problem or issue inherent in these FIDS systems is that it may be somewhat time consuming and difficult to locate the flight of interest by the specific user. In situations where there could be 8 or more displays each displaying 30 flights sorted in various ways, finding specific flight information may be difficult. In situations where there is a single display being used to display as many as 25 pages of flights with as many as 30 flights per page, the delay between pages and the difficulty of locating/identifying a specific flight information may take an extremely long time or be almost impossible altogether.

Additionally, airport operators often provide a static graphical depiction of the airport layout in addition to the flight information either as an additional display page (part of the conventional FIDS systems) or an actual physical poster located near the FIDS where a user can, with a certain level of effort, ascertain how to get to where they need to go.

Conventional FIDS display systems do not provide any method of interaction where a user could easily request a display of the specific information in which he or she may be specifically interested. In addition, there may be no way for the conventional FIDS systems to recognize what information it should display to people looking at the displays. With these static and limited conventional information displays, it is very difficult for users to derive the information that they require or may find useful in a clear, concise and easy method.

SUMMARY OF THE DISCLOSED EMBODIMENTS

A low-cost display unit that displays wayfinding information to a traveler in a public travel-related area is disclosed and may include a communication interface that facilitates receiving of travel-related information, a machine-readable marking reader that determines the presence of a travel document having one or more machine readable markings, scans the one or more machine-readable markings, and decodes the scanned one or more machine-readable markings, wherein the one or more machine-readable markings contain encoded traveled-related information pertaining to the traveler; and a display control unit that receives the decoded one or more machine-readable marking, determines the traveler's destination in the public travel-related area from the decoded one or more machine-readable markings, determines the path that the traveler should travel to reach the destination, and displays the determined path to the traveler on the low-cost display unit.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DESCRIPTION OF THE DISCLOSED EMBODIMENTS

Figure 1:
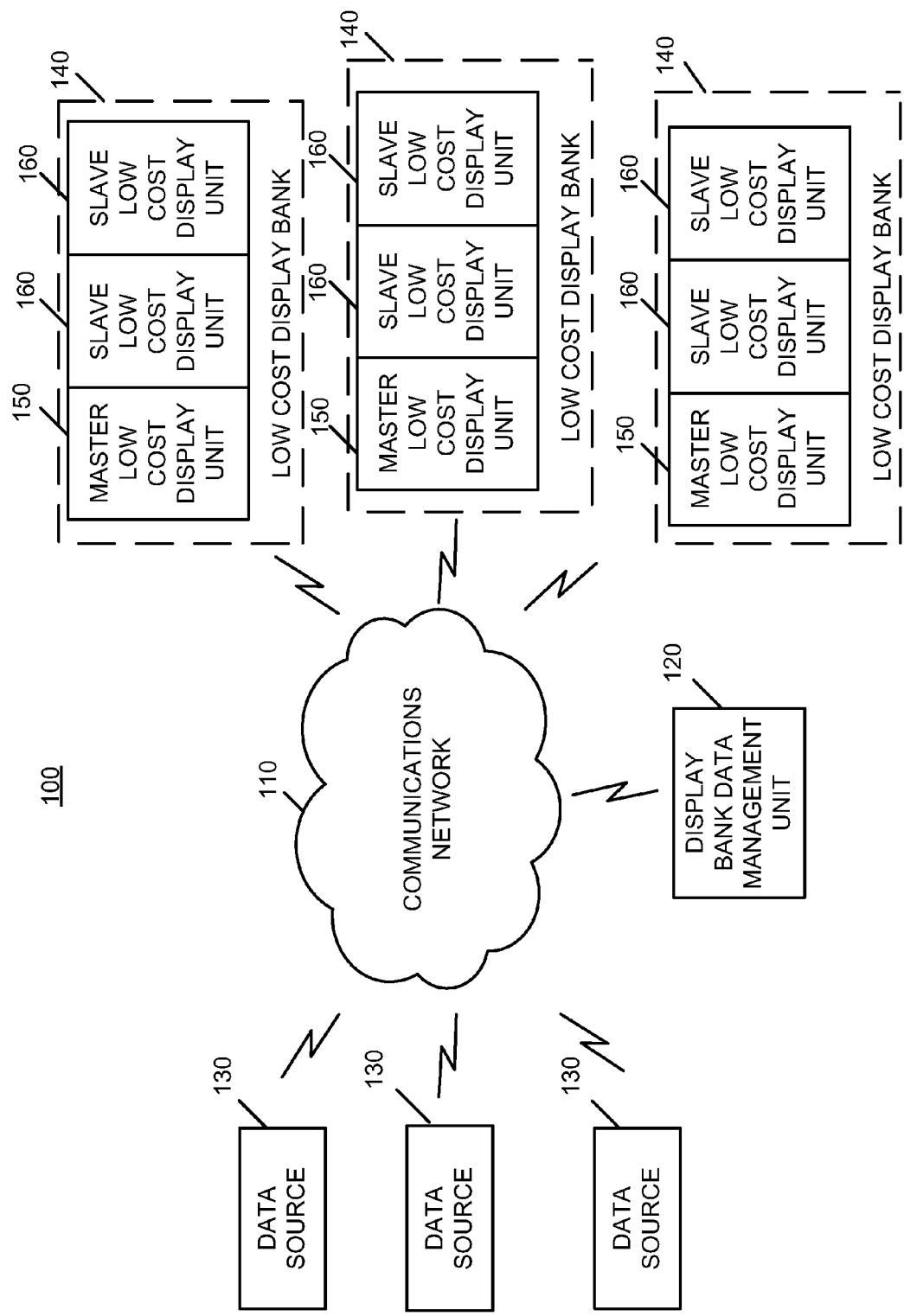
FIG. 1 is an exemplary diagram of a low-cost display bank management environment in accordance with a possible embodiment of the disclosure.
Figure 2:
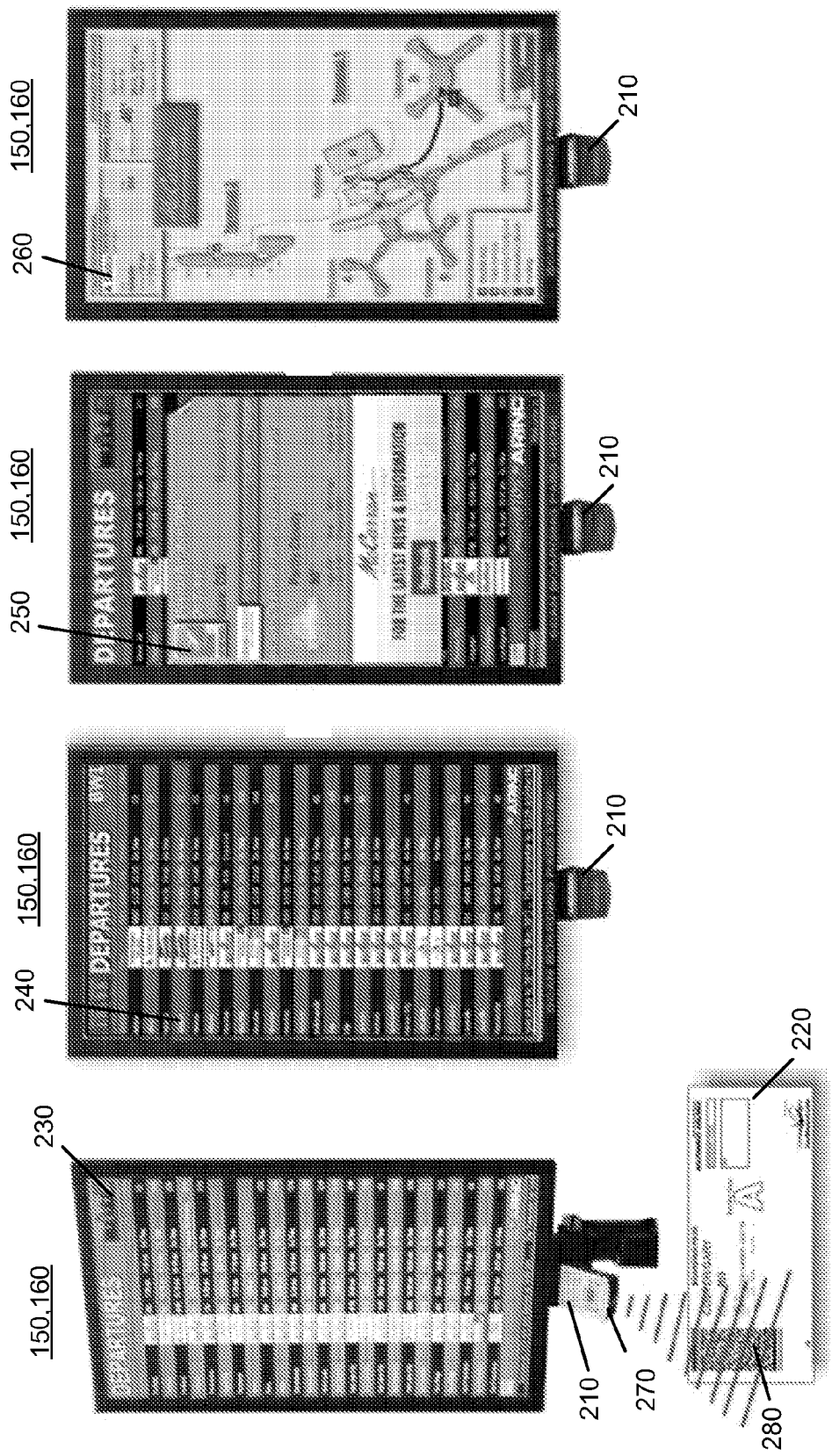
FIGS. 2A-2D are diagrams of an exemplary low-cost display unit with a machine-readable marking reader showing various content in accordance with a possible embodiment of the disclosure.

Additional features and advantages of the disclosed embodiments may be set forth in the description which follows, and in part may be obvious from the description, or may be learned by practice of the disclosed embodiments. The features and advantages of the disclosed embodiments may be realized and obtained by means of the instruments and combinations particularly pointed out in the appended claims. These and other features of the present disclosed embodiments may become more fully apparent from the following description and appended claims, or may be learned by the practice of the disclosed embodiments as set forth herein.

Various embodiments of the disclosed embodiments may be discussed in detail below. While specific implementations may be discussed, it should be understood that this be may be done for illustration purposes only. A person skilled in the relevant art may recognize that other components and configurations may be used without parting from the spirit and scope of the disclosed embodiments.

The disclosed embodiments comprise a variety of embodiments, such as a method and apparatus and other embodiments that relate to the basic concepts of the disclosed embodiments. Note that while this disclosure discusses aircraft, airline and travel-related uses for the disclosed embodiments, the disclosed embodiments by no means limited to that area and may be applied to a wide variety of environment and uses.

The proposed disclosed system and method concerns a method and apparatus for the access, combination, formatting, dissemination, and display of various types of visual and/or audible information on various low-cost display technologies.

The low-cost display technologies may include display devices that may be becoming more readily available on the market and with little or no modification to the hardware be or operating system, may be connected via a wireless or wired network in order to receive information for display. The low-cost display devices may support network connectivity that may be always connected, or only sometimes connected. For example, if a device has a constant network connection, information may be streamed in a continuous manner to the device from the server (using HTTP/HTTPS or other protocols over TCP/IP). If the device may be only occasionally connected (e.g., in a mobile installation in which the vehicle may be connected only during certain points of its journey), data may be refreshed during connectivity and the data may be displayed until a data validity expiration time may be reached, or until new data may be retrieved once connectivity may be restored.

In addition, the data feeder service, in conjunction with the devices, may be configured to display information relevant to a particular portion of a journey. For example, a bus (such as an airport or rental car shuttle) traveling toward an airport may display flight departure information, while the same bus traveling away from the airport and perhaps toward the parking lot or rental car facility may display local traffic and weather conditions.

Data may be retrieved or be received from various sources over a public or private network by a central server process. The data retrieval and storage process may normalize (if necessary) the data and store it in a relational database, for example. The database may also contain profile information for displays containing details such as display size, screen resolution, firmware be revision, types of data to display, etc.

The data formatting central server process may retrieve the data for a display or set of displays from the database, based upon the display profile, assemble data into information to be displayed. Information could be in the form of XML, RSS, static images, HTML pages, etc., for example.

The information broadcast central server process may receive information bound for displays and either transmit it to a display, or set of displays, or hold it until a display retrieves it (the system supports the concept of the display acting as a client or a server).

The information broadcast server process may also support other types of displays or devices, such as a client on a personal computer, a web browser, or even a kiosk.

All aspects of the above processes and the system as a whole may be controlled by the system management console, through which data sources and display profiles may be added, modified, or deleted. Thus, a single (or distributed) information management unit may perform all or some of the above-described processes.

The disclosed embodiments may concern passenger specific interactive access to and presentation of accurate and specific flight Information and Airport Way-Finding and guidance capabilities using boarding pass barcode scanning technology integrated with single or multi low-cost displays (e.g., a bank or array) installations of Flight Information Display Systems (FIDS) (or "microFIDS").

The disclosed embodiments may include a hardware be component (machine-readable marking reader, such as a bar code scanner) and necessary software be logic, data access and communications capabilities integrated into existing Flight Information Display Systems (generic term=FIDS) or provided as part of a new product based on FIDS capabilities. This be may be an integration of hardware be (Barcode reader) and software be (decoding and presentation application) that adds functionality and increases usability to accessing available FIDS information, other related data and provides a dynamic real time Way-Finding capability that provides users a graphic depiction showing where they may be and the shortest/appropriate route to either their departure gate for departing passengers or to the appropriate baggage claim location for arriving passengers. The system may optionally depict calculated travel time between actual location and decoded airport destination (departure gate/arrival baggage collection).

The technical capabilities discussed concerning the disclosed embodiments may be divided into three groups. They may include:
1) The Machine-readable marking reader technology attached to or in the proximity of FIDS displays and the necessary computer processing capability. Other embodiments of passenger interaction with the system may include other technologies such as Near Field Communication (NFC) chips embedded in personal electronic devices such as cellular telephones and biometric identification of the specific passenger in order to query the flight databases and determine the specific flight information needed,
2) The necessary logic and data retrieval capability required for the system to access and present suitable and appropriate information to the user, and
3) The Configuration and System Management tools and capabilities required by system administrators to easily configure and manage the system.

The technical components of this system may be focused on three distinct areas of capabilities and methods, which may include:
1) The unique passenger identification technology (i.e. Bar Code Scanner, NFC, RFID, Biometric) attached to or in the proximity of FIDS displays,
2) The necessary logic and data retrieval capability required for the system to access and present suitable and appropriate information to the user, and
3) The Configuration and System Management tools and capabilities required by system administrators to easily configure the system.

1) User Interaction

The disclosed embodiments may provide a capability that may easily be integrated into single display and multi-display FIDS systems and provides an easy means to see specific relevant flight information almost immediately.

By integrating a machine-readable marking reader with a FIDS display or with a bank or array of displays, a customer may present his or her boarding pass to an integrated machine-readable marking reader located in close proximity to the FIDS display or attached directly to it, and the system may scan the boarding pass barcode, decode the barcode, search active flight information records and display the specific flight information in a number of ways.

One display option may include the capability of displaying the shortest/appropriate path to the destination gate or arrival baggage collection location as appropriate.

Information that may be displayed to the passenger may includes, inter alia:
Airline name, graphic icon and flight number
Assigned Gate—or—Assigned Baggage Collection Location
Scheduled Departure Time
Estimated Departure/Arrival Time
Flight Status (on time, late, canceled etc)
Destination/Origin Airport
Real Time Destination Weather Information
A detailed graphical depiction of the airport physical layout with a detailed overlay of Way-Finding information including the users current location, the shortest/appropriate path and the decoded airport destination. If the resource exits for the specific airport, the expected delays at security checkpoints may be displayed overlaid at their actual locations on the map.
Transit time from a user's current location to departure gate or baggage claim area.
Specific Advertisements The system may be remotely configured using a server based central configuration and management utility, with alternatives/options for displaying resulting data to the user.

Three configurations for the display of the aforementioned data to the user once a successful scanning of their boarding pass has occurred may include:
1) The simplest display may automatically change the view of the active FIDS data page to display the page that had the flight data that corresponded to the decoded flight scanned by the barcode scanner. The actual flight line may be highlighted in some manner, such as a red frame drawn around the target information line, for example.
2) Another alternative display may display a pop up window that showed the specific flight information and destination weather in a pseudo boarding pass representation—a boarding pass facsimile. Note that the bottom section of the pop up display may display appropriate advertisements.
3) Another alternative may show a full screen pop up that integrates a Way-Finding graphical map or representation of the airport layout, thus enabling a clear, concise and easy to understand presentation of the calculated shortest or appropriate route to destination gate or baggage claim area depending on whether the boarding pass decoded was for an arriving or departing flight.

At airports where the Way-Finding option may not be configured, the pop up flight info screen may typically be displayed. The system may alternately display a message showing that the flight was not found or that the barcode was not read correctly, for example. The machine-readable marking reader technology may be capable of reading and processing information for all 1D and 2D barcode formats that have been adapted for airline boarding pass use. Once a travel-related document such as a boarding pass having a machine-readable marking (e.g., bar code) may be successfully read, the decoded information extracted from the barcode may be time stamped, categorized and communicated to the FIDS server system for archiving and access by other server based management and analytical applications that may utilize the rich data collected by the machine-readable marking readers for multiple purposes such as determining the amount of utilization of a specific FIDS location.

Other Interactive Technologies

As previously mentioned, other embodiments of the passenger interaction with the system may include other technologies such as Near Field Communication (NFC) chips embedded in personal electronic devices such as cellular telephones and integrated biometric identification technologies such as finger print scanners in order to uniquely identify the specific passenger in order to query the flight databases and determine the specific flight information needed.

It may be envisaged that the system may utilize its communications capabilities to identify passengers using unique identity tokens (NFC, RFID and Biometrics) and access centralized databases to determine unique passenger identification and correlate the passenger to active flight data thus enabling all the features and data displays discussed in the document.

Optional Communications Related Real-Time Information Capabilities

It should be noted that capabilities have been described in conjunction with the disclosed embodiments may provide the user with value added information. Information relating to items such as the actual destination weather report and anticipated queuing time at the Security Checkpoints at the airport (used to determine projected time to travel from actual location to destination departure gate) may be retrieved in near real-time by the system. Having decoded the destination from the encoded boarding pass may provide the system a way to identify the destination to which the user may be traveling and thus, allows the system to query other sources of data in order to retrieve the appropriate data/information and subsequently display this be data in an integrated, rich graphical presentation. As well as accurate flight status and destination weather, the system, knowing the users projected path to their destination gate, may determine which security checkpoint may be traversed and may request the real-time queuing/delay time extrapolated for the specific security checkpoint and may display this information to the user as well.

The Transit Time from the user's actual location to the decoded airport destination may optionally include the expected security checkpoint queuing time providing the user a more complete and accurate transit time estimate. This capability may reduces a user's stress and may provide the user an opportunity to adjust their progress as they see fit in order to eat or shop as desired.

2) System Logic and Data Retrieval Capability
   Communications

As previously described, the system may provide information to the user in response to a boarding pass being scanned at a FIDS location resulting in the details embedded in the boarding pass barcode being decoded and further analyzed by the system. Some of the information to be displayed to the user may be stored locally on the FIDS system (live flight data) and some of the information may be fetched from external systems in real-time (Destination Weather information and Security Checkpoint queuing time).

The information display component, after decoding the barcode data, may begin a process of displaying the graphic image to the user on the appropriate nearby display and simultaneously, makes data requests to external systems to gather the non-local, additional data necessary to add to the graphic display being presented to the user. This may be a multi-threading functionality provides for less perceived delay time to the user as he or she begins absorbing the presented information and appears almost instantaneously.

The disclosed FIDS embodiments depicted herein may communicate to their respective server systems and to external data sources over the internet. Connections to the internet may be accomplished using multiple technologies including wireless (WiFi, WiMAX and Cellular) as well as by wired IP connections, for example.

Value Added Logic—Way-Finding & Guidance

The most complex functionality integrated into the disclosed FIDS embodiments may be the Way-Finding or User Guidance capability. In today's world, airports have become complex facilities with multiple levels and terminal buildings separated by larger and larger distances and by complex multi-modal transportation alternatives including moving sidewalks, trams and busses. The complexity of getting from one airport location to another, such as the departure gate, further confuses and frustrates the common traveler already stressed by potential delays and unknown issues such as not knowing how long it may take to get to the gate.

While many airports provide many maps and graphics to assist the traveler in determining where to go, these devices may be static and do not provide specific/tailored guidance. The machine-readable marking reader technology coupled with the knowledge about where the machine-readable marking reader may be and being able to decode from the boarding pass, where the user needs to go provides an opportunity to, unambiguously, provide precise guidance to the user on a graphic display and even to provide an approximation of the time required for the user to get to the destination with consideration or environmental variables such as expected queuing time at security check points and transportation time utilizing available modes (bus or tram etc).

The machine-readable marking reader processing logic integrates Network Topology logic to determine the shortest/appropriate route between any two points in a given facility, in this case, an airport. The term "shortest" may be simple to define and means, the route that takes the least time to complete where the term, for example. "Appropriate", in this description, means that the route may not be the shortest path but that the route accommodates certain optional parameters suggesting an alternate route, perhaps longer, than the calculated shortest path, but may be preferable due to certain criteria such as staying inside the building, remaining in secure areas of the airport or not traversing a parking lot.

The methods used to accomplish the shortest/appropriate path determination may be based on creating and utilizing a database that relates to the physical attributes of the facility being mapped for guidance. The components of the database may include;

Accurate graphical depiction/image of the entire facility which may be geo-referenced by a coordinate system such as x and y (pixels)

A set of unique identifiers (numbers) and their coordinates for all the network nodes or points that should create the paths in the facility, A set of values which may be referred to as the "COST" between all connected network nodes. For any pair of nodes, this be represents the weighting factor such as the distance or transit time between all connecting nodes. These values may be adjusted to weigh specific options precisely.

A set of network node to gate/location relationships. (i.e., Gate D1 may be located near node 33). All locations need to relate to their closest node. Locations include destination/departure gates, arrival baggage carousels and the locations where the machine-readable marking reader devices may be to be deployed (Where You Are).

The locations of specific icons/facilities such as the security checkpoints, busses and trams. These item locations may be typically already defined as network nodes as well but may be generally also depicted on the map on top of route displays.

The process of converting the machine-readable marking reader scanned data into a route that may be displayed to the user over a graphic representation of the airport may include knowing the actual machine-readable marking reader location (Node ID) and decoding the flight ID from the boarding pass information and matching the specific flight information with the active flight database to extract the associated gate or carousel identity and then matching that information with the associated network node identity and location. This process in effect, provides the "From-To" information as two specific Network nodes and subsequently generates the path to be depicted using the inter-node cost values associated with the two nodes as defined in the database.

Value Added Logic—Transit Time Calculation & Display

In today's complex airport environments, knowing how much time may be required to travel from one's current location to the place one need to go (typically a departure gate) could be a significant piece of information that may be determined and displayed to users by the system described in this be document. Integrating various sources of data to provide more accurate and reliable real-time estimates of anticipated wait or queuing times for transportation modes as well as for other delays resulting from security checkpoint backlogs may be added to the time factors already defined as "COST" elements of the Way-Finding database.

At a minimum, the system may determine the distance from current location node to the destination node and factor basic walking speed/distance to display approximated walking time on the graphical Way-Finding map. This be may also accommodate stored values for transportation modes if utilized, such as, the bus typically takes 6 minutes, or may simply advise the user that times depicted exclude security and transportation transit times. If real-time data may be available for the specific airport from other, external automated systems, such as the TSA, actual queuing time may be available for each specific security checkpoint and may be retrieved and integrated into the transit time values displayed to the user.

Another embodiment may display the real-time queuing times, obtained from previously mentioned external systems or optionally to integrate delay time estimation capabilities into the Way-Finding platform. The queuing times may be overlaid on all security checkpoints graphically (as depicted in the following figure) on the Way-Finding map thus proving the user the opportunity to utilize the least congested security checkpoint and therefore potentially reducing delay.

Way-Finding Delay Time Integration

Each host display/processor capable of supporting the machine-readable marking reader and Way-Finding display may optionally include a radio frequency (RF) detection device that may be utilized to detect the proximity of uniquely identifiable electronic devices such as cellular telephones, PDA, and tablet computers. The low-cost display host/server system may be capable of receiving data packets from location known networked RF based detection devices (depicted in following figure) and archiving the data for further processing.

The additional processing may include determining the actual time between specific observations of unique electronic devices (typically the low-cost display locations) and creating a running average of the time between pairs of locations. The low-cost display scanning stations/displays may typically be located individually before and after a specific area where determination of transit time averages may be desired, such as before and after a security checkpoint. The data may be distributed to Way-Finding displays whenever a user scans his or her boarding pass. The resulting Way-Finding display may include the actual determined average transit time for each security checkpoint, as an example.

Additional value may be achieved from further analysis be of the collected data. Certain data items such as "How much dwell time was observed at low-cost displays", could be calculated from available information. The primary value of this process may be calculated average delay/transit time may be in the ability of overlaying the information about real-time delay at security check points displayed on the low-cost display Way-Finding map.

Another benefit of having the appropriate delay/transit time data available may be that of the capability to display this be information to other organizations or customers that could benefit from such real-time strategic information. Government security organizations and airport management may view graphic depictions of the airport environment with an integrated depiction of the real-time delay/queuing times at configured locations.

The following figure may be an example of such a real-time display of average queuing times at the 5 security checkpoints at BWI airport. Note that color coding, text and graphics methods may be all used to denote various conditions (preset in configuration). It may be easy to determine status of any checkpoint at a glance.

The real-time status application depicted below may also provide mechanisms to select various parameters to display such as: Real-time average time, graphs for last 24 hours, last week, last month, etc. The capability may be provided to easily share his or her data with others by simply entering in an email address and sending a snapshot of the display as a graphic by executing a "Share" command.

Besides dedicated applications for tablet or remote devices, it may be also possible to use a web based browser to observe the necessary data on any internet enabled PC that may connect to the low-cost display server that processes and hosts the necessary information.

Value Added Logic—Archiving & Analysis of Collected Boarding Pass Data

All machine-readable marking reader (e.g., Bar Code Scanning) enabled devices (low-cost displays and mobile devices) may be configured to communicate the scanned boarding pass data to the low-cost display server for archiving thus providing historical data for future analysis. In addition to the boarding pass data, the actual device identification, location of the device, time and date of the scan may be also appended to the boarding pass data transmitted to the server. The server may store all scanned boarding pass data as well as the device specific communicated information in a database that may be accessed by the user to generate specific analytical reports, such as:

How many boarding passes have been scanned per hour/day/week, etc. at a specific device or a designated group of devices, Utilization statistics (graphs and tables) of specific airport devices, How many advertisements were displayed as a result of a boarding pass scan, and Other analytics as desired.

Customers/Users may only have access to data from the specific devices that may be configured in their specific portfolio.

3) System Management and Reconfiguration Capabilities iSMART—Integrated Screen Management and Reconfiguration Tool The low-cost display system may include a robust "On-Line" or Web based configuration and management tool referred to as "iSMART". The iSMART has been designed so that it may provide multiple levels of access to its capabilities. This process may accommodate the assignment/limitation of configuration control capabilities to specific defined classes of users including a system administrator function that may exercise much greater configuration control. Typically, a customer may have the appropriate access authority to define and control the configuration of their specific collection or portfolio of devices.

While the description herein may refer to several of the iSMART capabilities, such as configuring a device as Machine-readable marking reader enabled or turning on or off the communications of scanned boarding passes for system archiving, this description may only discuss the unique Way-Finding map and network configuration capability developed for system administrators to define and manage the basic database required by the Way-Finding capability.

Way-Finding Base Database Tool

As previously described in the "Value Added Logic—Way-Finding & Guidance" discussion, a capability has been created that provides a graphical tool that allows system administrators to easily add, delete and generally manage all the elements required to define the basic database required to perform the Way-Finding capability for a specific site/airport in a dynamic and interactive manner.

All the database elements for a specific airport may be displayed graphically. For example, the system administrator building or editing the database may modify the values and items simply by mouse movements and appropriate menu selections. When the modifications may be completed, the system administrator may publish the finished database to the low-cost display server and the necessary data elements may be subsequently downloaded to all the appropriate displays configured for the Way-Finding capability of the specific airport database that was modified and published.

For example, the display may show:
  The basic graphical depiction of the facility where Way-Finding may be configured/enabled,
  All node locations (white—numbered circles)
  "Cost" values between connected nodes (gray—red numbered circles)
  Defined connector paths (black lines between connected nodes)
  Node selected as display default location ("You May be Here")
  Locations of electronic device RF detector pairs may also be managed and displayed using this be tool if implemented
Other Embodiments—Mobile Applications and Functionality With the availability of integrated location awareness capabilities, cameras and communications into various personal and portable electronic devices, the functionalities and capabilities described herein may be applied to the aforementioned devices by utilizing their inherent capabilities to accomplish the previously described functional features of the machine-readable marking reader and graphic display on the device itself.

For phones and tablets devices with integrated cameras, the user may take a picture of a boarding pass and the low-cost display like application may then decode the barcode portion exactly as described above. The device may then communicate the device's current location (known from GPS information received on the device, for example) and the decoded flight information to the low-cost display server (see Communications Architecture figure) and subsequently receive the departure gate or arrival carrousel information (and transit time data if available) response from the server and then generate the Way-Finding graphic image for display on the device.

Digital copies of boarding passes may be becoming popular for distribution to mobile, communications enabled devices. The system (mobile application) described in the previous paragraph, may also accommodate the decoding of barcodes imbedded in digital boarding passes received by email or other travel related mobile applications such as "TripIt". In this be case, a camera decoded boarding pass may be not required and the mobile low-cost display like application may extract the flight information from the digital travel information (or email) and follow the same steps as described in the previous paragraph to display the necessary information on the device.

FIG. 1 is an exemplary diagram of a low-cost display bank management environment 100 in accordance with a possible embodiment of the disclosure. The low-cost display bank management environment 100 may include a display bank data management unit 120, one or more data sources 130, one or more low-cost display banks 140, all connected through communications network 110. Note that although the connections in FIG. 1 are shown as a wireless configuration, one or more of these connections may also be wired.

Communications network 110 may represent any communications network used to communicate with other entities, including the Internet, an intranet, a radio network, a wireless network, etc. The one or more data sources 130 may be include one or more databases that contain information for dissemination to the display bank data management unit 120 for formatting and transmitting to one or more display banks 140 for display. The data sources 130 may also be the receiving and forwarding hub for real-time or near-real time information, such as flight/train status information, current weather conditions, etc.

The display bank data management unit 120 may be any server, computer, processing device, personal digital assistant (PDA), or other similar device capable of storing and managing media publications, receiving, formatting and processing FIDS data, and other documents and products. The one or more low-cost display banks 140 may include a master low-cost display unit 150 and one or more slave low-cost display units 160.

The master low-cost display unit 150 may represent a local or remote low-cost display device that is capable of displaying (or playing) data to passengers and/or customers that has been received from one or more data source 130 that has been received and formatted by the display bank management unit 120. The master and slave low-cost display units 150, 160 may be a display unit such as an electrophoretic (e-paper) display, or other low-cost display unit, etc., for example. The slave low-cost display unit 160 may receive information from the master low-cost display unit 150 for display. If the master and slave low-cost display units 150, 160 are e-paper display units, the e-paper display units are a low-cost display unit that may be viewed in lighting conditions similar to paper and may not require any backlighting, which reduces power cost and increases longevity of the display.

In the low-cost display bank 140, the master low-cost display unit 150 may be a "smart" display unit. The "smart" master low-cost display unit 150 may act as a master of the other displays. In this regard, the master low-cost display unit 150 may have communication capabilities (e.g., wired, wireless, Wi-Fi, RF, remote control, etc.) to receive the data from a network or wired/wireless data source (e.g., Internet, intranet, local area network, wide-area network, Wi-Fi, etc.) to be displayed on the entire low-cost display bank 140 from the display bank data management unit 120, data source server 130, etc.

The master low-cost display unit 150 may then disseminate the information to be displayed to the slave low-cost display units 160 in the low-cost display bank 140. The slave low-cost display units 160 may then display the information as directed by at least one of the master low-cost display unit 150, a remote control, or other content display control mechanism. For example, in a low-cost display bank 140 having 4 low-cost display units 150, 160, the master low-cost display unit 150 may receive flight and weather data and designate slave low-cost displays units 160 #1 and #2 to display departures, slave low-cost display units 160 #3 and #4 to display arrival, and the master low-cost display unit 150 #5 to display current weather in the airport city and possibly other destinations. As another example, one or more of the low-cost displays units 150, 160 may be used to designate baggage information, subway schedules, rental car information, advertisements, etc. As such, the low-cost display units 150, 160 may be operated as a "cloud" technology.

Note that while a bank of displays 140 is shown, the disclosed embodiments may be performed on a single low-cost display unit 150, 160 as known to one of skill in the art. For example, instead of displaying different information on each display in the display bank 140, the information may be displayed in a paging format where the information displayed on one screen remains in place for a period of time before switching to the next information to be displayed. In addition, there may be soft or hard buttons on the display 150, 160 to expedite paging through the information screens, for example.

The low-cost display bank 140 may be any set of display units 150, 160 that is significantly lower in cost compared to conventional display units used in travel-related circumstances (in airports terminals, train stations, bus depots, rental car locations, restaurants located in such areas, etc.) such as expensive LCD and plasma displays. For example, such low-cost display units 150, 160 may be hundreds of dollars whereas conventional LCD and plasma displays used for the same purpose cost tens of thousands of dollars.

Only the master low-cost display unit 150 may be required to be a "smart" display unit (e.g., be able to receive and transmit information wired or wirelessly, or be able to perform some processing or formatting on such received information, etc.). The low-cost display bank 140 may also have reduced processing power and reduced features that are unneeded for its purpose. The low-cost display bank 140 of the type discussed in the disclosed embodiments also use reduced amounts of power, thus saving the users significantly on their electric bills. In this manner, the low-cost display banks 140 and display bank data management unit 120 of the disclosed embodiments may reduce airport terminal costs by the millions.

The master low-cost display unit 150 may receive a wide variety of information for display, such as travel information (e.g., arrival and departure information (for any mode of transportation), train schedules, cruise stops/schedules, subway maps or schedules, bus schedules, area/location/city maps, terminal maps, gate or port locations, rental car information (e.g., car locations numbers and/or maps, bus stop location, terminal location, etc.), baggage information (location, bag identification, etc.), advertisements, hotel or restaurant information, weather information (e.g., forecast or current weather information at current location, various destinations, etc.). The master low-cost display unit may then send the information to slave low-cost display units 160 for display.

FIG. 2A-2D are diagrams of an exemplary low-cost display unit 150, 160 having machine-readable marking reading capabilities in accordance with a possible embodiment of the disclosure. The exemplary low-cost display unit 150,160 may be a master display unit 150 or a slave display unit 160 in a display bank 140, or may be a stand-alone, single low-cost display unit 150,160, for example.

As shown in FIG. 2A, the exemplary low-cost display unit 150,160 may be displaying travel-related content 230 (such as a list of departures, as shown) and may include a machine-readable marking reader 210. By integrating a machine-readable marking reader 210 with a single low-cost display unit 150,160 or with a low-cost display bank 140, a traveler can present his or her travel-related document 220 (e.g., ticket, boarding pass, itinerary, baggage receipt, etc.) to an integrated machine-readable marking reader 210 attached directly or located in close proximity to the low-cost display unit 150, 160. The machine-readable marking reader 210 may be any electronic code reader, such as a barcode reader (or scanner), for example, that may read and decode any type of encoded markings, such as 1D, 2D, and 3D barcodes, and data glyphs, for example.

A sensor 270 located in the machine-readable marking reader 210 may determine that a document with one or more machine-readable marking 280 is present in close proximity to the machine-readable marking reader 210. The machine-readable marking reader 210 may then scan (or read) the one or more encoded the machine-readable marking 280 on the travel-related document 220, decode the encoded machine-readable marking 280, search active flight information records, and display the specific flight information to the traveler on the low-cost display unit 150,160 in a number of ways.

For example, one display option may include the capability of displaying the shortest/appropriate path to the destination gate or arrival baggage collection location as appropriate. Other information that can be displayed to the passenger includes, inter alia:

Airline name, graphic icon and flight number
Assigned Gate—or—Assigned Baggage Collection Location
Scheduled Departure Time
Estimated Departure/Arrival Time
Flight Status (on time, late, canceled etc)
Destination/Origin Airport
Real Time Destination Weather Information
A detailed graphical depiction of the airport physical layout with a detailed overlay of Way-Finding information including the users current location, the shortest/appropriate path and the decoded airport destination. If the resource exits for the specific airport, the expected delays at security checkpoints can be displayed overlaid at their actual locations on the map.
Transit time from users current location to departure gate or baggage claim area.
Specific Advertisements The low-cost display unit 150,160 may be remotely configured using a server based central configuration and management utility, such as the display bank data management unit 120, with alternatives/options for displaying resulting data to the user.

FIGS. 2B-2D provides examples of three possible configurations for the display of the aforementioned data to the user once a successful scanning of their travel related document 220 has occurred. FIG. 2B shown an embodiment where the low-cost display unit 150,160 would automatically change the view of the active FIDS data page to display the page 240 that had the flight data that corresponded to the decoded flight scanned by the machine-readable marking reader 210. The actual line containing the flight information of the traveler's flight may then be highlighted in some manner. The example in FIG. 2B shows a red frame drawn around the flight information line of the traveler as determined from the decoded information contained in the machine-readable marking 280, for example.

FIG. 2C shows another alternative low-cost display unit 150,160 that would display a pop-up window 250 that shows the specific flight information and destination weather in a pseudo-boarding pass representation (e.g., a boarding pass facsimile). Note that the bottom section of the pop-up display may display other travel-related information, such as appropriate advertisements, for example.

FIG. 2D shows another alternative embodiment that may show a full-screen pop-up that integrates a Way-Finding graphical map 260 or representation of the airport layout, thus enabling a clear, concise and easy to understand presentation of the calculated shortest or appropriate route to destination gate or baggage claim area depending on whether the travel-related document 220 decoded was for an arriving or departing flight, for example.

The low-cost display unit 150,160 may alternatively display a message showing that the flight was not found or that the machine-readable marking 280 was not read correctly. The machine-readable marking reading technology may be capable of reading and processing information for all 1D, 2D, 3D and data glyph formats that have been adapted for airline boarding pass, ticketing, etc. use.

Once a machine-readable marking travel-related document 150,160 is successfully read, the decoded information extracted from the machine-readable marking may be time stamped, categorized and communicated to the FIDS server system (e.g. the display bank data management unit 120) for archiving and access by other server based management and analytical applications that can utilize the rich data collected by the machine-readable marking reader 210 for multiple purposes such as determining the amount of utilization of a specific FIDS location.

Figure 3:
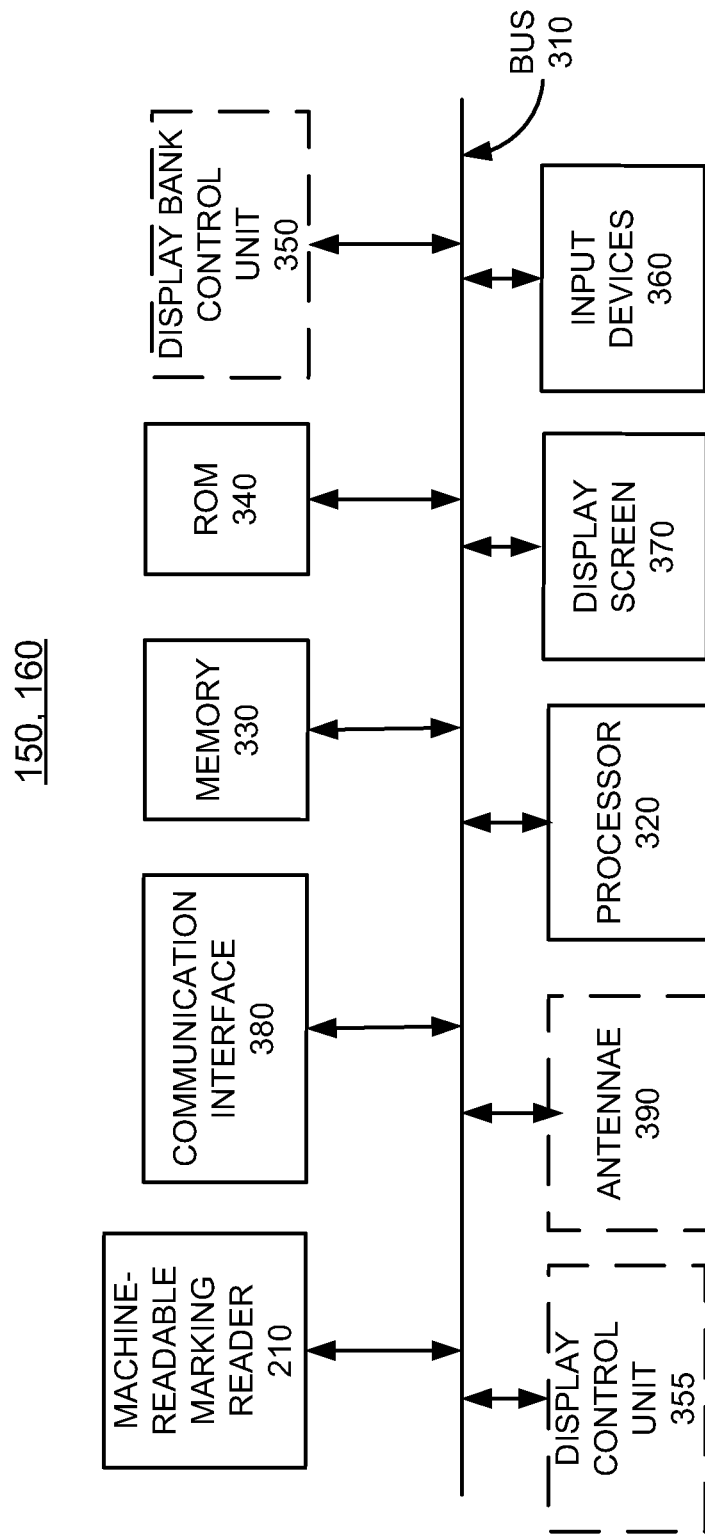
FIG. 3 is a block diagram of an exemplary low-cost content display unit in accordance with a possible embodiment of the disclosure.

FIG. 3 is a block diagram of an exemplary low-cost display unit 150, 160 in accordance with a possible embodiment of the disclosure. The exemplary low-cost display unit 150, 160 may include a bus 310, a processor 320, a memory 330, a read only memory (ROM) 340, a display bank control unit 350 (for a master low-cost display unit 150 in a display bank 140 configuration), a display control unit 350 (for a single, standalone low-cost display unit 355 or a slave low-cost display unit 160 in a display bank 140 configuration), input devices 360, display screen 370, a communication interface 380, and antennae 390 (for the master or standalone low-cost display unit 150).

Processor 320 may include at least one conventional processor or microprocessor that interprets and executes instructions. Memory 330 may be a random access memory (RAM) or another type of dynamic storage device that stores information and instructions for execution by processor 320. Memory 330 may also store temporary variables or other intermediate information used during execution of instructions by processor 320. ROM 340 may include a conventional ROM device or another type of static storage device that stores static information and instructions for processor 320. Memory 330 may also represent any type of storage media or media drive, such as, for example, magnetic or optical recording media and its corresponding drive.

Input device 360 may include one or more conventional mechanisms that may permit a user to input information to the master low-cost display unit 150, such as a keyboard, a mouse, a pen, a voice recognition device, etc.

Communication interface 380 may include any transceiver-like mechanism that enables the master low-cost display unit 150 to communicate via a network. For example, communication interface 380 may include a modem, or an Ethernet interface for communicating via a local area network (LAN). Alternatively, communication interface 380 may include other mechanisms for communicating with other devices and/or systems via wired, wireless or optical connections. The antennae 390 may represent any antenna, modem, or other device that works in conjunction with the communication interface that facilitates the reception (and sending) of electronic signals, such as radio frequency (RF), Wi-Fi, wireless communication, remote control, infra-red, etc. The machine-readable marking reader 210 may be any electronic code reader, such as a barcode reader (or scanner), for example, that may read and decode any type of encoded markings, such as 1D, 2D, and 3D barcodes, and data glyphs, for example.

The display bank control unit 350 may control the operation of the master low-cost display unit 150 in a display bank 140 configuration, and the display control unit 355 may control the operation of the single, standalone low-cost display unit 150,160. In this manner, the display bank control unit 350 or the display control unit 355 may control the reception and display of data source content for display, such as travel-related information as discussed above in relation to FIG. 2, for example.

The display bank control unit 350 or the display control unit 355 may receive travel data through the communication interface 380 that may contain travel-related information from one or more data sources 130 and the display bank data management unit 120. The travel-related information may include arrival information, departure information, subway schedules, terminal maps, station maps, location maps, advertisements, paging information, emergency information, current time and date information, and weather information, for example. The display bank control unit 350 or the display control unit 355 may then display the received travel-related information on the display screen 370 and in the case of the display bank control unit 350, command one or more slave low-cost display units 160 to display information on each display screen that has been assigned for display by that particular slave low-cost display units 160.

The low-cost display unit 150, 160 may perform such functions in response to processor 320 by executing sequences of instructions contained in a computer-readable medium, such as, for example, memory 330, a magnetic disk, or an optical disk. Such instructions may be read into memory 330 from another computer-readable medium, such as a storage device, or from a separate device via communication interface 380.

Figure 4:
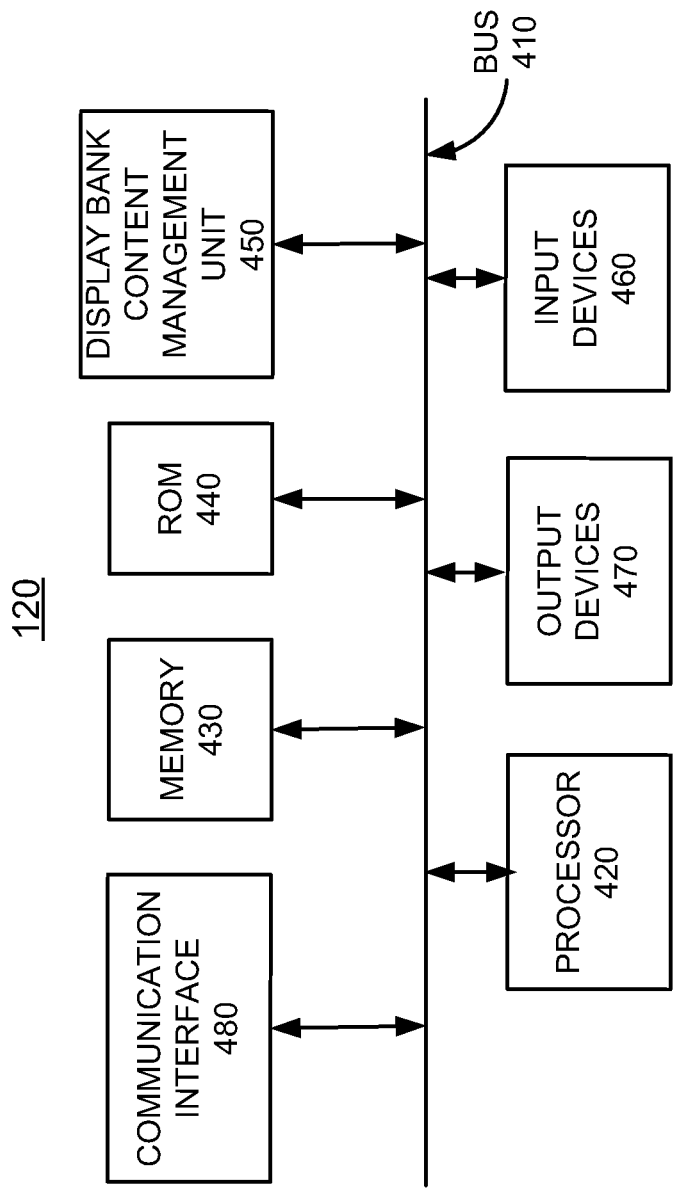
FIG. 4 is a block diagram of an exemplary display bank management unit in accordance with a possible embodiment of the disclosure.

FIG. 4 is a block diagram of an exemplary display bank data management unit 120 in accordance with a possible embodiment of the disclosure. The exemplary display bank data management unit 120 may include a bus 410, a processor 420, a memory 430, a read only memory (ROM) 440, a display bank content management unit 450, input devices 460, output devices 470, and a communication interface 480. Bus 410 may permit communication among the components of the display bank data management unit 120.

Processor 420 may include at least one conventional processor or microprocessor that interprets and executes instructions. Memory 430 may be a random access memory (RAM) or another type of dynamic storage device that stores information and instructions for execution by processor 420. Memory 430 may also store temporary variables or other intermediate information used during execution of instructions by processor 420. ROM 440 may include a conventional ROM device or another type of static storage device that stores static information and instructions for processor 420. Memory 430 may also represent any type of storage media or media drive, such as, for example, magnetic or optical recording media and its corresponding drive.

Input device 460 may include one or more conventional mechanisms that may permit a user to input information to the display bank data management unit 120, such as a keyboard, a mouse, a pen, a voice recognition device, etc. Output device 470 may include one or more conventional mechanisms that output information to the user, including a display, a printer, one or more speakers, or a medium, such as a memory, or a magnetic or optical disk and a corresponding disk drive.

Communication interface 480 may include any transceiver-like mechanism that enables the display bank content management unit 450 to communicate via a network. For example, communication interface 480 may include a modem, or an Ethernet interface for communicating via a local area network (LAN). Alternatively, communication interface 480 may include other mechanisms for communicating with other devices and/or systems via wired, wireless or optical connections.

The display bank data management unit 120 may perform such functions in response to processor 420 by executing sequences of instructions contained in a computer-readable medium, such as, for example, memory 430, a magnetic disk, or an optical disk. Such instructions may be read into memory 430 from another computer-readable medium, such as a storage device, or from a separate device via communication interface 480.

The display bank data management unit 120 and the low-cost display bank 140 illustrated in FIGS. 1-4 and the related discussion are intended to provide a brief, general description of a suitable computing environment in which the disclosure may be implemented. Although not required, the disclosure will be described, at least in part, in the general context of computer-executable instructions, such as program modules, being executed by the display bank data management unit 120 and the low-cost display bank 140, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

For illustrative purposes, the operation of the display bank content management unit 450 and the display bank content management unit 450 process will be described below in FIG. 5 in relation to the block diagrams shown in FIGS. 1-4.

Figure 5:
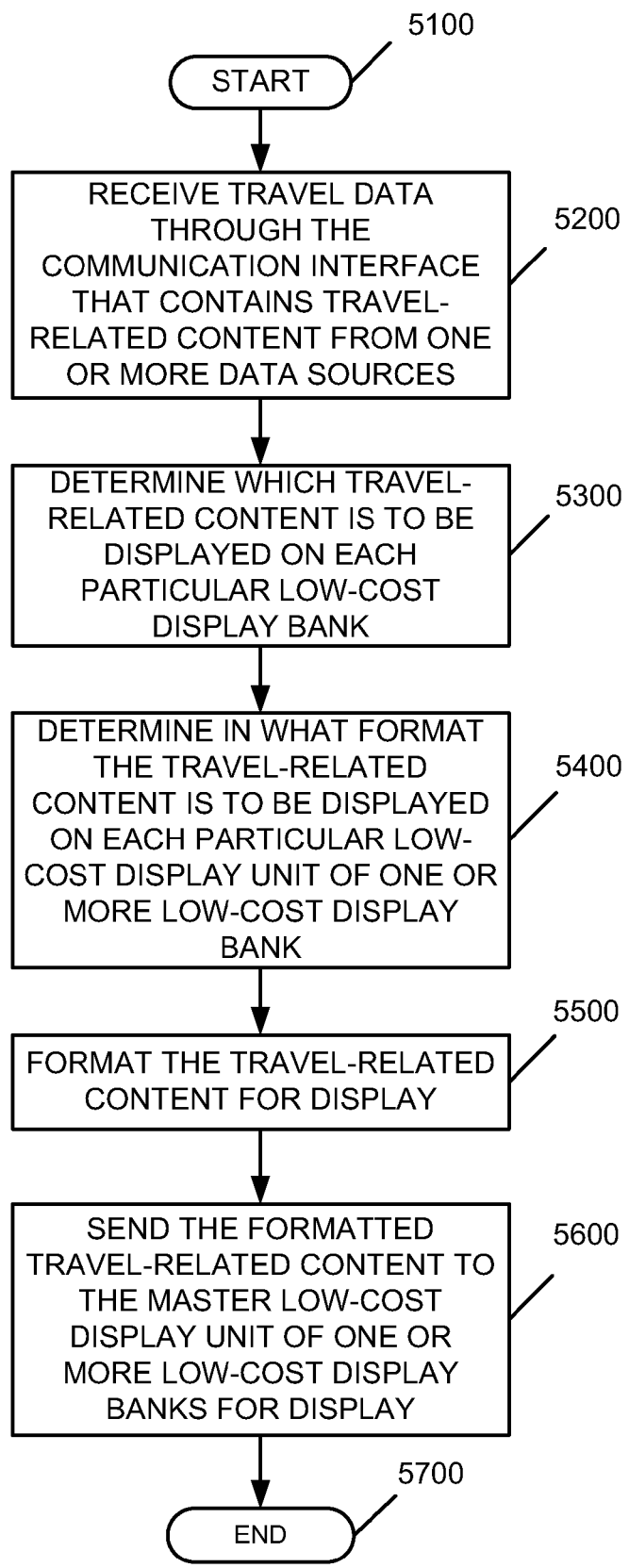
FIG. 5 is an exemplary flowchart of a low-cost display bank data management process in accordance with one possible embodiment of the disclosure.

FIG. 5 is an exemplary flowchart of a low-cost display data management process in accordance with one possible embodiment of the disclosure. The process begins at step 5100 and continues to step 5200 where the display bank content management unit 450 may receive travel data through the communication interface 480 that contains travel-related information from one or more data sources 130. The travel-related information may include arrival information, departure information, subway schedules, terminal maps, station maps, location maps, advertisements, paging information, emergency information, current time and date information, weather information, or any other possible travel related information.

At step 5300, the display bank content management unit 450 may determine which travel-related information is to be displayed on each particular low-cost display bank 140, and in possibly, each particular low-cost display unit 150, 160 of each particular low-cost display bank 140. The information content may also be scheduled so that different content is displayed on a low-cost display unit 150, 160 of the low-cost display bank 140 at different times of the day. For example, one display may display one advertisement from 5 am to noon (e.g., a breakfast restaurant) and a different advertisement from noon-11 pm (e.g., a dinner restaurant).

At step 5400, the display bank content management unit 450 may determine in what format the travel-related information is to be displayed on each particular low-cost display bank 140. In formatting the travel-related data information, the display bank content management unit 450 may determine where on the screen of each particular low-cost display unit 150, 160 the travel-related information is to be displayed. At step 5500, the display bank content management unit 450 may format the travel-related information for display (e.g., XML, etc.). At step 5600, the display bank content management unit 450 may send the formatted travel data to one or more master low-cost display unit 150 of one or more low-cost display banks 140 through the communication interface 480 for display to passengers, customers, etc. The travel-related information may be sent to one or more of the low-cost display banks 140 by wired or wirelessly technology, such as Wi-Fi, RF, modem, 802, internet, intranet, or in accordance with another possible wired or wireless method or standard. The process may then go to step 5700 and end.

Figures 6A, 6B:
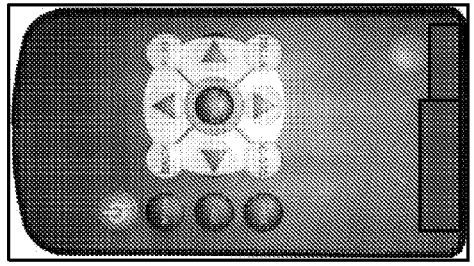
FIG. 6A is an exemplary screenshot of a possible local configuration interface for the master low-cost display unit or single, standalone low-cost display unit
FIG. 6B is a possible remote control for interacting with the possible configuration interface for the master low-cost display unit or single, standalone low-cost display unit in accordance with a possible embodiment of the disclosure.

FIG. 6A is an exemplary screenshot of a possible local configuration interface 600 for the master low-cost display 150 for a low-cost display bank 140, or for a single, standalone low-cost display unit 150,160 in accordance with a possible embodiment of the disclosure. The local configuration interface 600 may allow a user to locally configure the low-cost display bank 140 using the master low-cost display unit 150 or the single, standalone low-cost display unit 150,160 to display a particular venue (e.g., a particular airport (e.g., Baltimore Washington International Airport (BWI)), train station, bus station, etc.), with particular information, such as arrival, departure, weather, etc. The each of the low-cost display units 150, 160 in the low-cost display bank 140 or single, standalone low-cost display unit 150,160 may be configured using the master low-cost display unit 150 to display one category of travel-related information, such as departures, or may be configured to alternate the display between arrivals, departures, weather, and one or more advertisements. The low-cost display units 150, 160 in the low-cost display bank 140 or single, standalone low-cost display unit 150,160 may also be configured to display multiple amounts of information of the same screen, such as weather and an advertisement, for example.

In addition, if a low-cost display bank 140 or single, standalone low-cost display unit 150,160 is placed in a restaurant, for example, the display may also be configured to display any specials, entertainment scheduled, etc. If a low-cost display bank 140 or single, standalone low-cost display unit 150,160 is placed in a rental car bus, the parking spot of rental cars for VIP customers may also be displayed with arrival and/or departure information, for example. The low-cost display bank 140 or single, standalone low-cost display unit 150,160 may be controlled by a local computer, a touch screen (if the low-cost display units 140 or single, standalone low-cost display unit 150,160 are so designed), or a remote control, for example.

FIG. 6B is a possible remote control 610 for interacting with the possible configuration interface for the master low-cost display units 150 of the low-cost display bank 140 or single, standalone low-cost display unit 150,160 in accordance with a possible embodiment of the disclosure. The remote control 610 may contain a plurality of buttons (e.g., on/off, up down arrows, paging change, menu, etc.) to facilitate the interaction with a particular master low-cost display unit 150 or single, standalone low-cost display unit 150,160. In this manner, the remote control 610 may facilitate selecting display options (e.g., information, content, appearance, etc.) from menus that may appear on the low-cost display units 150, 160 in the low-cost display bank 140 or single, standalone low-cost display unit 150,160.

Figure 7:
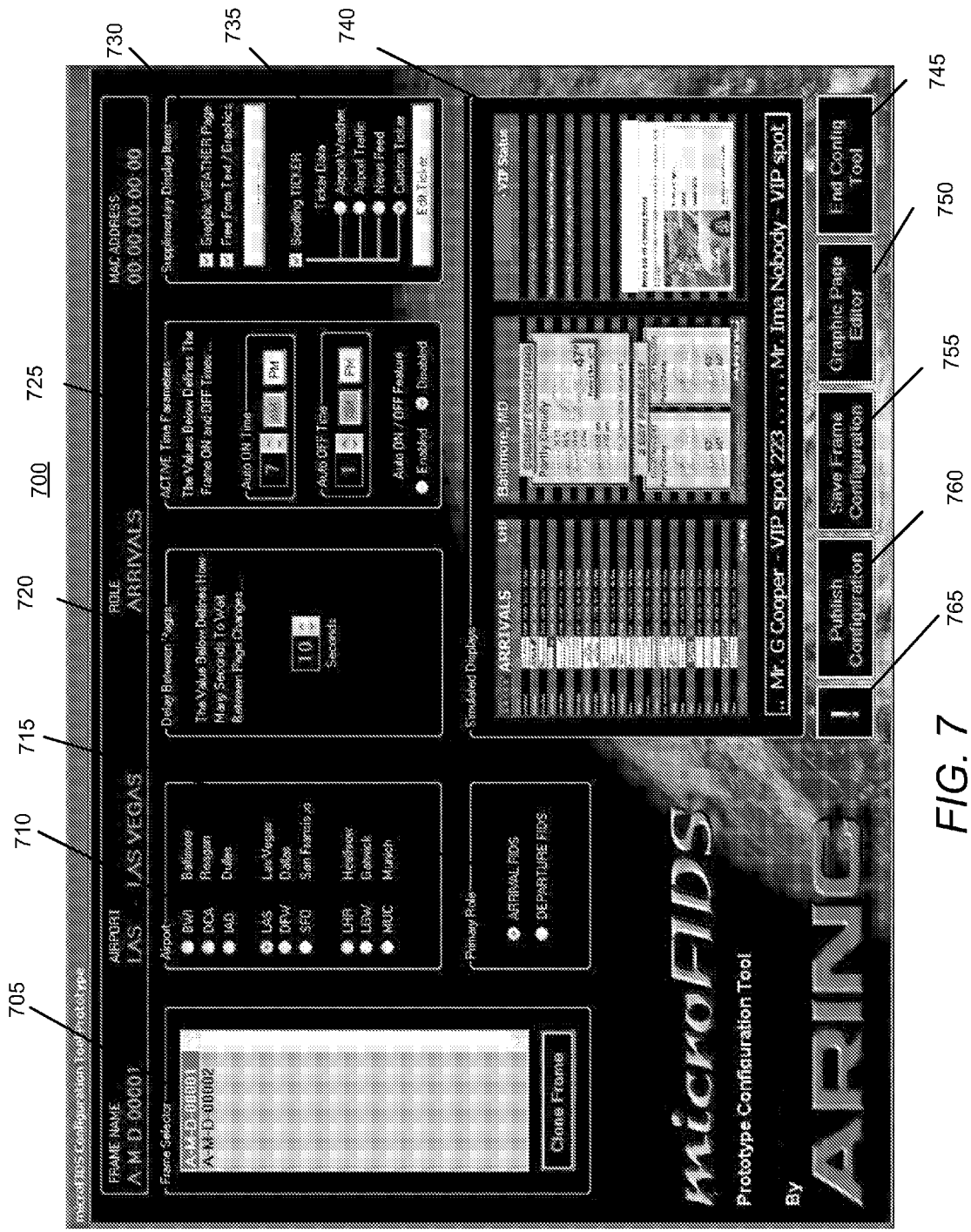
FIG. 7 is an exemplary screenshot of a remote configuration interface for the low-cost display bank or single, standalone low-cost display unit in accordance with a possible embodiment of the disclosure.

FIG. 7 is an exemplary screenshot of a remote configuration interface 700 for the low-cost display bank 140 in accordance with a possible embodiment of the disclosure. The remote configuration interface 700 may be a computer, server, PDA, application device, processing device, etc. based interface which may be web-based, a stand-alone application or it may be part of a software package, for example. The remote configuration interface 700 may include menus and selection boxes that may facilitate the remote (or local) configuration parameters and creation of individual master or slave display unit 150, 160 or single, standalone low-cost display unit 150,160 profiles or low-cost display unit bank 140 profiles for one or more low-cost display units 140. These profiles may determine what information each low-cost display bank 140 and low-cost display unit 150, 160 in the low-cost display bank 140, or single, standalone low-cost display unit 150,160 will display (e.g., arrival information, departure information, weather, ticker, etc.) and how the information will be presented (e.g., position of information on the screen, delay between showing certain information, etc.).

In the example shown in FIG. 7, the remote configuration interface 700 may include a frame configuration selection box 705, a venue configuration selection box 710, a information configuration selection box 715, a delay time configuration selection box 720, an on/off time configuration selection box 725, a weather page configuration selection box 730, a ticker configuration selection box 735, a display preview box 740, an end configuration box 745, a graphic advertisement configuration selection box 750, a save configuration selection box 755, an upload configuration selection box 760, and a help configuration selection box 765. For the purposes of the disclosed embodiments, a user may be a system operator, a customer, an information technology person, owner, travel terminal worker, or any other person that may configure the information and/or appearance of one or more low-cost display banks 140 or single, standalone low-cost display unit 150,160.

The frame configuration selection box 705 may allow a user to select a particular low-cost display bank 140 or low-cost display unit 150, 160 within the low-cost display bank 140, or single, standalone low-cost display unit 150,160 to configure at one or more particular venues. For example, at an airport, a particular display bank 140 or single, standalone low-cost display unit 150,160 may be identified and selected that may be in a particular terminal gate area, a restaurant, bar, etc. However, the configuration may be such that all low-cost display banks 140 or single, standalone low-cost display units 150,160 in a particular airport may be selected and configured display the same information or page through multiple display pages. The frame configuration selection box 705 may also allow selection of individual screens for the low-cost display units 150, 160 of an individual low-cost display bank 140 or single, standalone low-cost display unit 150,160 should the low-cost display units 150, 160 of the low-cost display bank 140 or single, standalone low-cost display unit 150,160 may be configured to display multiple alternating screens.

The venue configuration selection box 710 may allow a user to select which airport, train station, bus depot, cruise line and/or port, etc. the low-cost display bank 140 or single, standalone low-cost display unit 150,160 on which the particular information may be displayed. The information configuration selection box 715 may be used by a user to select the information content of a particular low-cost display unit 150, 160 in a particular low-cost display bank 140 or single, standalone low-cost display unit 150,160, such as one or more of arrival, departure, weather, advertisement, restaurant menu/specials, etc.

The delay time configuration selection box 720 may allow the user to select the delay time between page changes on low-cost display units 150, 160 of the low-cost display bank 140 or single, standalone low-cost display unit 150,160 that will alternate to show more than one page at various intervals. The on/off time configuration selection box 725 may used by a user to select whether a low-cost display bank 140 or single, standalone low-cost display unit 150,160 is to be automatically turned on and/or off and at what time a display bank 140 or single, standalone low-cost display unit 150,160 will automatically turned on and/or off.

The weather/advertisement page configuration selection box 730 may be used to select if a weather and/or graphic advertisement page is to be displayed and the location of the weather to be displayed, such as at the airport, in a city, one or more destination, etc. or to select a particular advertisement and/or advertiser to be displayed. The ticker configuration selection box 735 may be used to select a display of traffic, news, custom ticker (with paging, rental car location, news, special announcements, or other information. The display preview box 740 may be used to display a preview of one or more low-cost display bank's 140 or single, standalone low-cost display unit 150,160 display page and configuration prior to finalizing and sending to the master low-cost display unit 150 of the low-cost display bank 140 or single, standalone low-cost display unit 150,160.

The end configuration box 745 may used end the configuration process for one or more display banks 140 or single, standalone low-cost display unit 150,160 and may enable another low-cost display bank 140 or single, standalone low-cost display unit 150,160 to be configured. The graphic advertisement configuration selection box 750 may be used to edit a graphic advertisement page. The save configuration selection box 755 may be used to save a low-cost display bank's 140 or single, standalone low-cost display unit's 150,160 configuration.

The upload configuration selection box 760 may be used to upload or publish a configured low-cost display bank's 140 or single, standalone low-cost display unit's 150,160 pages to be displayed. The help configuration selection box 765 may be used to receive help from a local help database and/or program, or from a remote help center.

Figure 8:
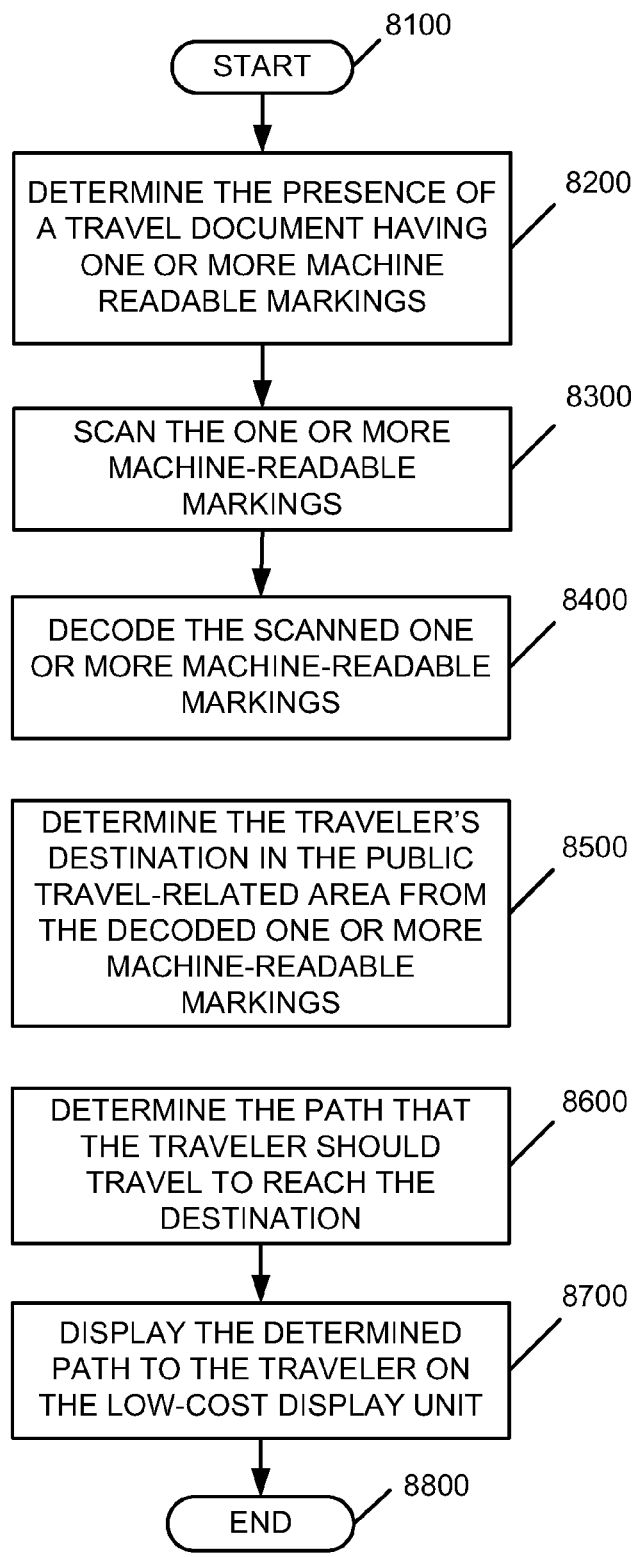
FIG. 8 is an exemplary flowchart of wayfinding using a low-cost display unit machine-readable marking reading process in accordance with one possible embodiment of the disclosure.

FIG. 8 is an exemplary flowchart of wayfinding using a low-cost display unit machine-readable marking reading process in accordance with one possible embodiment of the disclosure. The low-cost display unit 150,160 may be a single, standalone low-cost display unit or a master low-cost display unit 150 in a low-cost display bank 140, for example. The process may take place in a public travel-related area, such as an airport terminal, a train station, a bus terminal, a restaurant, a rental car location, a hotel, a hotel shuttle bus, or a rental car shuttle bus, for example. The process may begin at step 8100 and may continue to step 8200 where the machine-readable marking reader 210 may determine the presence of a travel document 220 having one or more machine readable markings 280. The one or more machine readable markings 280 may be a barcode, a two-dimensional barcode, a three-dimensional barcode, or a data glyph, for example. The one or more machine-readable markings 280 may contain encoded traveled-related information pertaining to the traveler. At step 8300, the machine-readable marking reader 210 may scan the one or more machine-readable markings 280. At step 8400, the machine-readable marking reader 210 may decode the scanned one or more machine-readable markings 280.

At step 8500, the display control unit 355 may determine the traveler's destination in the public travel-related area from the decoded one or more machine-readable markings 280. At step 8600, the display control unit 355 may determine the path that the traveler should travel to reach the determined destination. The display control unit 355 may determine the path using the travel distance of possible paths to the determined destination, a length of time of clearing one or more security checkpoints, and/or a predetermined walking speed, for example.

At step 8700, the display control unit 355 may display the determined path to the traveler on the low-cost display unit 150,160. The determined path may be displayed to the traveler on a map of at least a portion of the public travel-related area, for example. The determined path may also be displayed on one of a personal digital assistant (PDA), mobile communication device, personal computer, and mobile tablet processing device, as long as the device knows its location through any geographic positioning system (GPS), for example. The display control unit 355 may also display the length of time of clearing one or more security checkpoints in the public travel-related area on the low-cost display unit 150, 160. For example, this process may be performed by tracking signals from traveler's mobile communication devices, for example, and registering an average time the traveler spent from the beginning of the checkpoint to exiting the checkpoint. Other methods may be used as known in the art. The display of the security checkpoint information may be presented in any format such as a dashboard, for example, and may be shown on in a mobile communication device, tablet processing device, etc., as well. The process may then go to step 8800, and end.

The display control unit 355 may also receive travel-related information that may include the traveler's arrival information, departure information, gate assignment information, baggage claim area information, destination weather information, subway schedule information, terminal maps, station maps, location maps, advertisements, paging information, emergency information, and/or current time and date information, and may display the travel-related information along with the determined path to the traveler on the low-cost display unit on the low-cost display unit 150,160. The travel-related information is received by the low-cost display unit 150,160 wirelessly.

If the low-cost display unit 150,160 is a master low-cost display unit 150 in a low-cost display bank 140, the display bank control unit 350 may determine whether new travel-related information is available from the display bank data management unit 120. If the display bank control unit 350 determines that new travel-related information is available from the display bank data management unit 120, the display bank control unit 350 may display the travel-related information on the master low-cost display unit 150 and the one or more slave low-cost display units 160 based on the received display parameters. The travel-related information may be received by the master low-cost display unit 150 wirelessly.

The display bank control unit 350 may determine the current location of the low-cost display bank 140 and display the received travel-related information on the master low-cost display unit 150 and the one or more slave low-cost display units 160 based on the determined current location and the received display parameters.

Either the display bank control unit 350 or the display bank data management unit 120 may determine which travel-related information is to be displayed on the master low-cost display unit 150 and the one or more slave low-cost display units 160.

Either or both of the master low-cost display unit 150 and the one or more slave low-cost display units 160 may be controlled by a remote control unit 610 in close proximity the master low-cost display unit 150.

Figure 9:
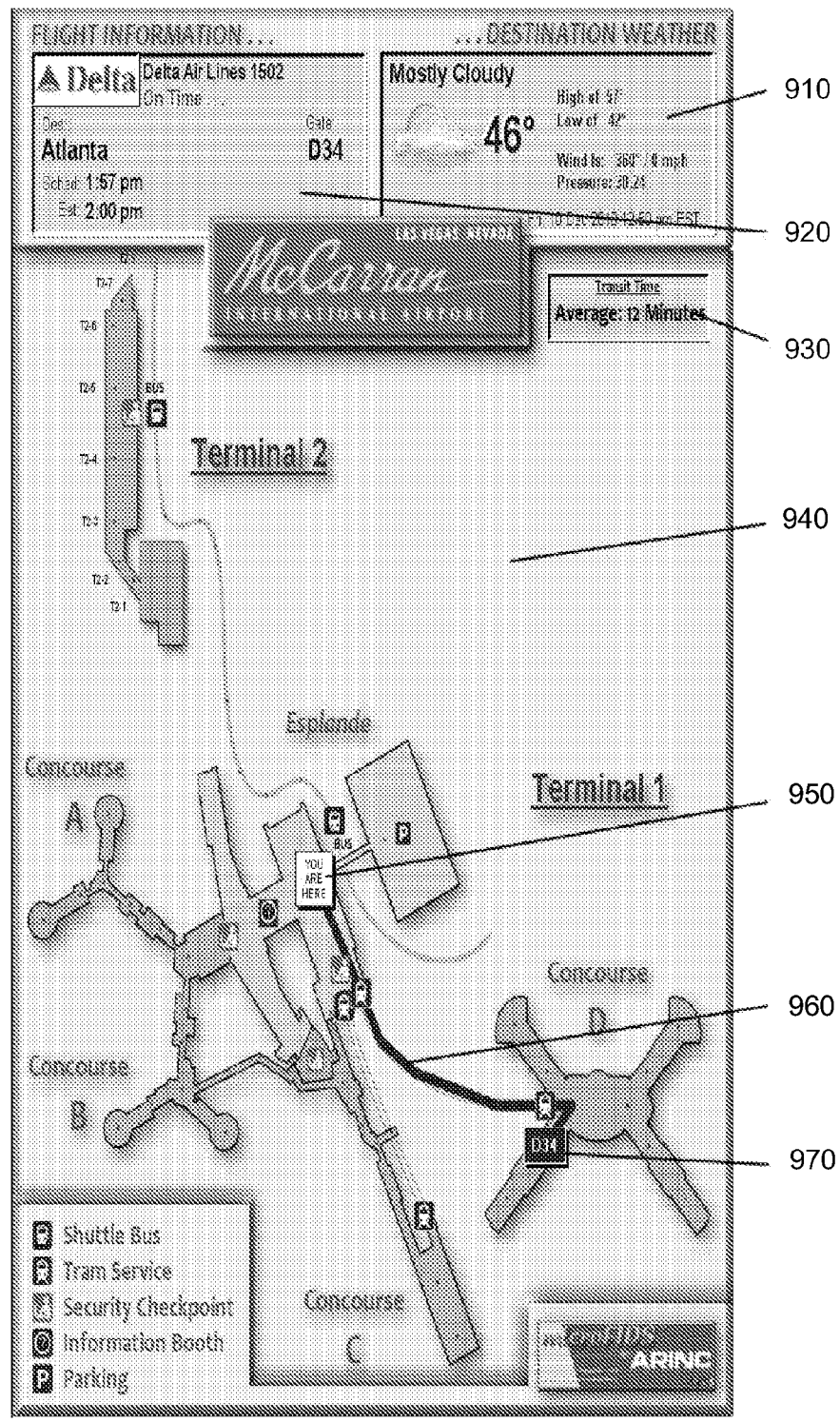
FIG. 9 is a diagram of an exemplary wayfinding screen on a low-cost display unit in accordance with a possible embodiment of the disclosure.

FIG. 9 is a diagram of an exemplary wayfinding screen 900 on a low-cost display unit 150, 160 in accordance with a possible embodiment of the disclosure. Once the traveler has scanned his or her boarding document 220, the machine-readable markings have been decoded, and the traveler's destination has been determined (e.g., flight gate, bus, train track, baggage claim area, etc.), the wayfinding screen may be displayed showing the traveler the determined path 960 to his or her destination from a "You Are Here" (presumably the known or determined location of the low-cost display unit 950, for example). This example shows the traveler's determined destination as an airline flight gate 970. While the determined path a terminal map 940 is shown in FIG. 9, the path to the user's destination may also be shown in any manner known to those of skill in the art.

The exemplary wayfinding screen 900 may also include other helpful information, such as the traveler's destination weather information 910, detailed travel information (e.g., gate, departure time, arrival time, etc.) for the traveler 920, and approximate travel time to the traveler's destination (e.g., gate, baggage claim area, etc.)

Figure 10:
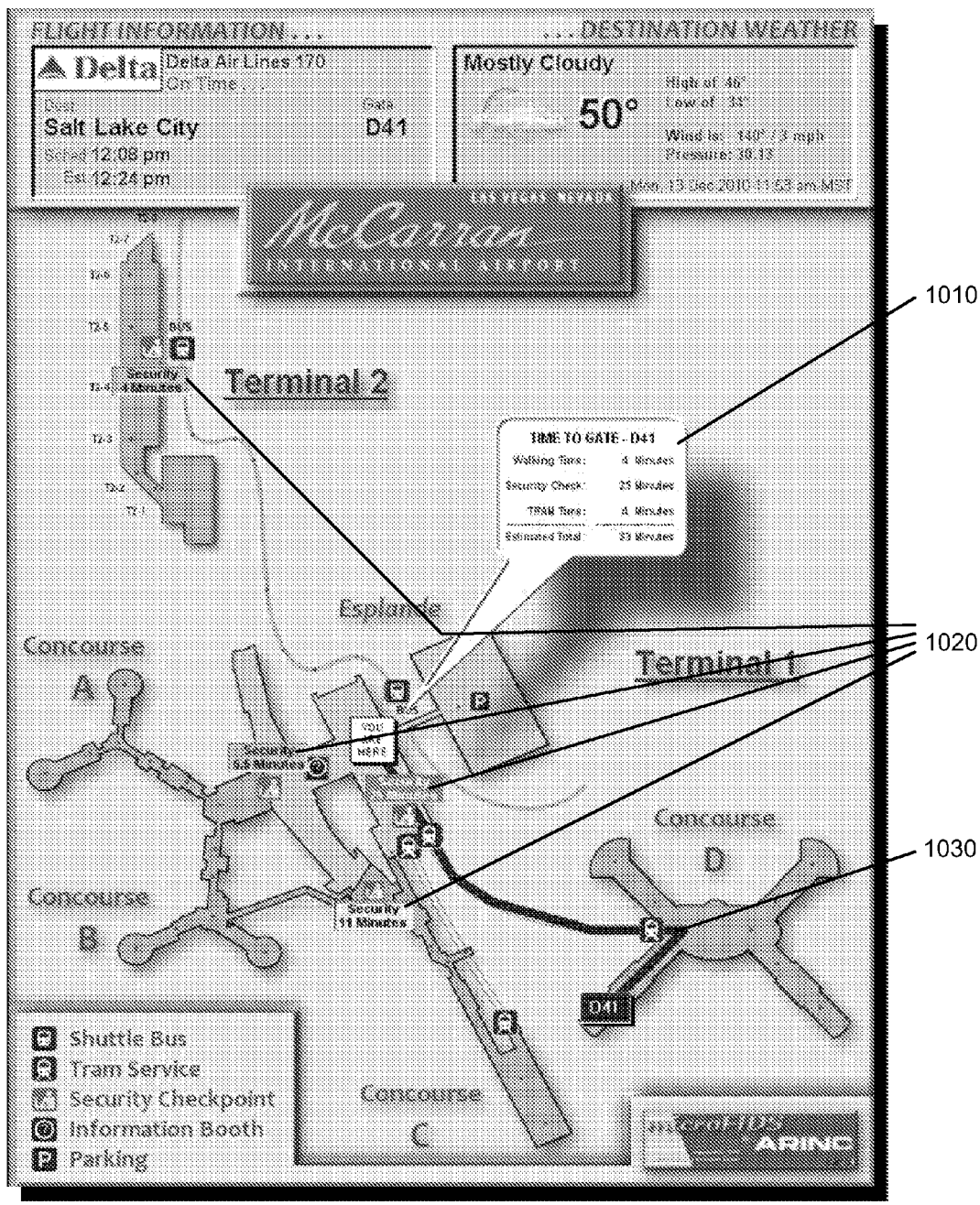
FIG. 10 is a diagram of another exemplary wayfinding screen on a low-cost display unit in accordance with a possible embodiment of the disclosure.

FIG. 10 is a diagram of another exemplary wayfinding screen 1000 on a low-cost display unit 150, 160 in accordance with a possible embodiment of the disclosure. The exemplary wayfinding screen 1000 may also show an exemplary pop-up window 1010 showing travel time to the traveler's destination in the public travel-related area, security checkpoints 1020 with the estimated time to clear the checkpoints 1020, and the traveler's determined path 1030. The exemplary pop-up window 1010 may include the estimated walking time to destination (a gate in this example), the estimated time to clear the optimal (or average) security checkpoint 1020, and a tram time for travel-related area having trams (such as an airport, as in this example), and a total estimated time to the traveler's destination using the determined path 1030.

Figure 11:
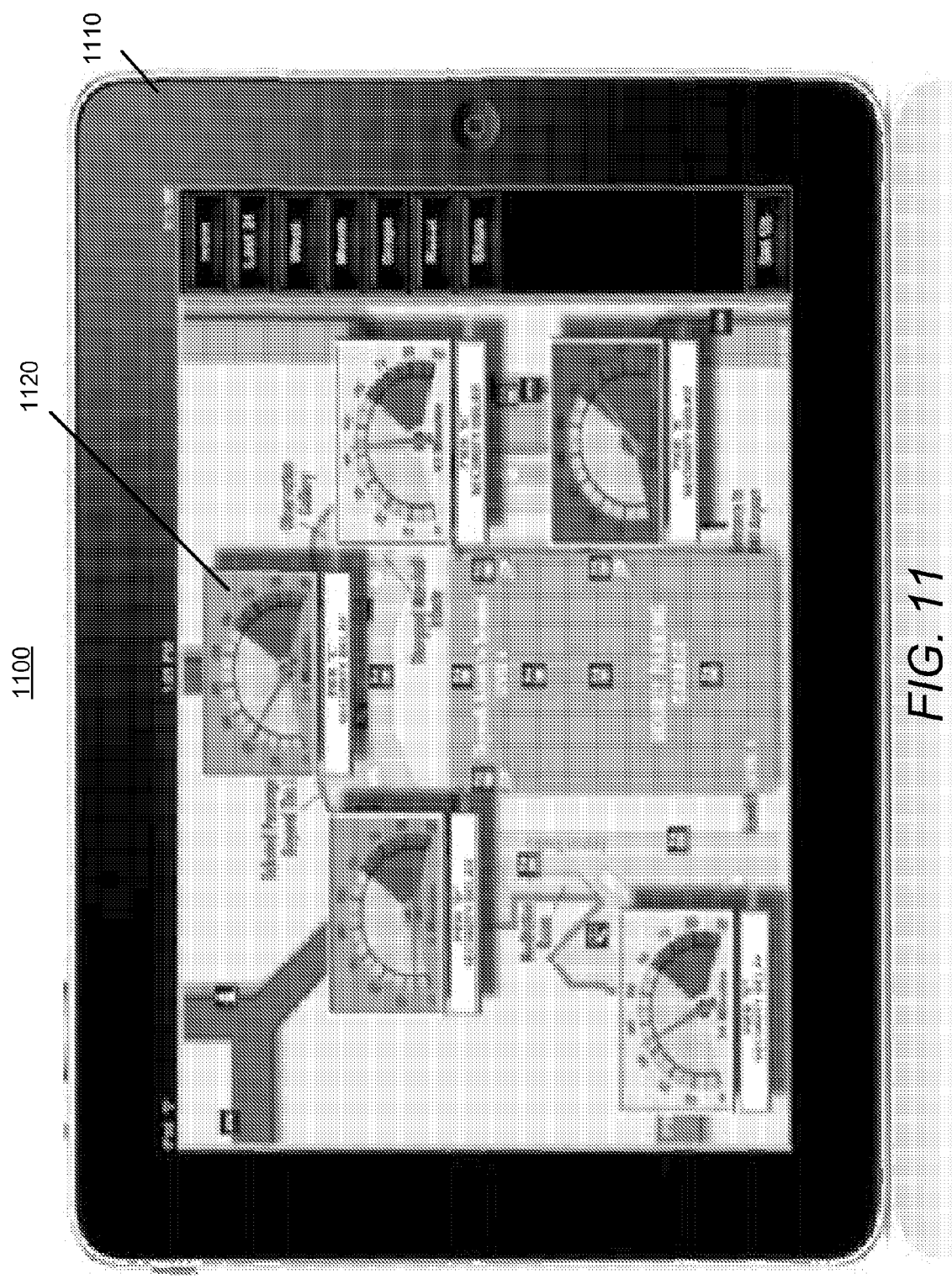
FIG. 11 is a diagram of an exemplary wayfinding dashboard showing security point waiting time in accordance with a possible embodiment of the disclosure.

FIG. 11 is a diagram of an exemplary wayfinding dashboard 1101 showing security point waiting time in accordance with a possible embodiment of the disclosure. The dashboard 1100 may include graphics 1120 (a meter in this example) or other manners to show the estimated time to clear one or more security checkpoints 1020. The dashboard 1100 may be displayed on a low-cost display unit 150,160, a mobile communication device, or a tablet processing device 1110 (as shown), for example. As discussed above, the estimated time to clear a security checkpoint 1020 may be computed from camera, information, mobile communication device tracking information (and/or GPS), or other methods and sent to a central server such as the display bank data management unit 120, for example.

Figure 12:
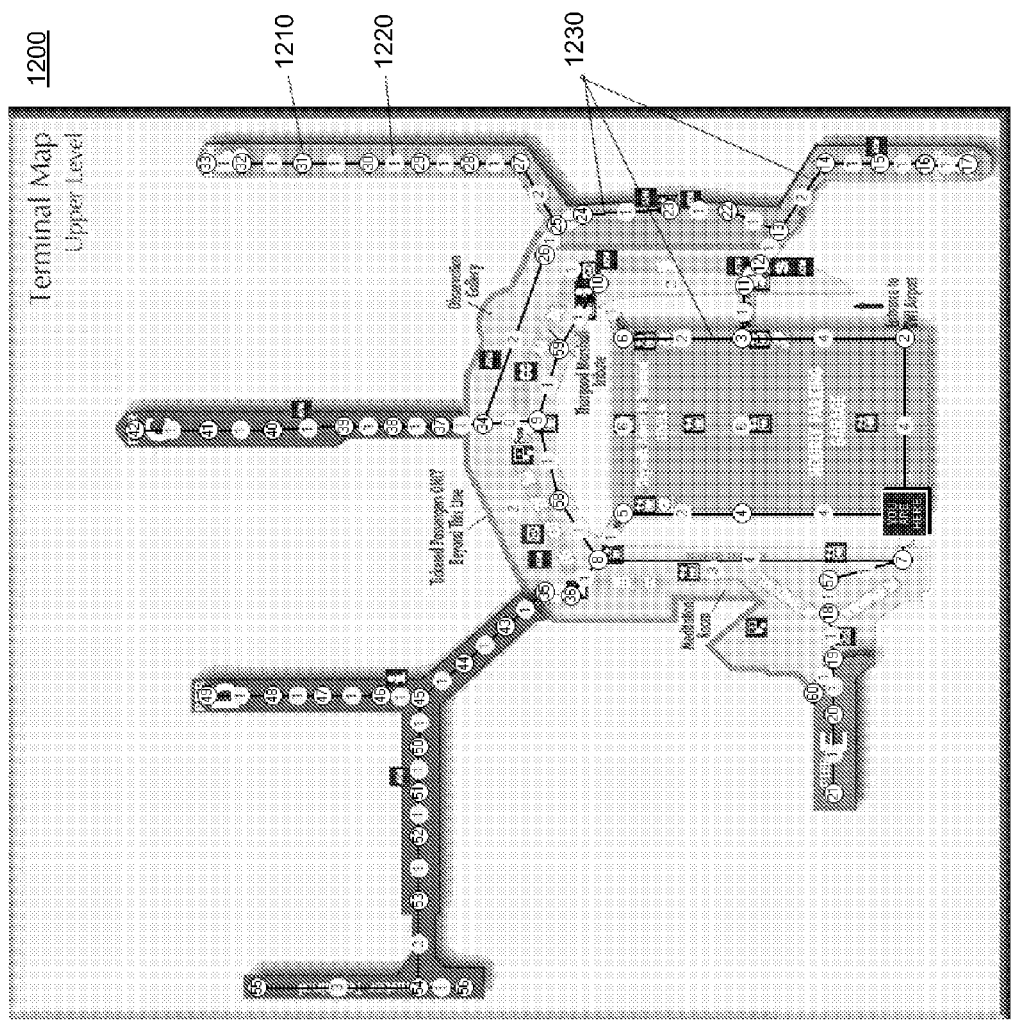
FIG. 12 is a diagram of an exemplary wayfinding screen on a low-cost display unit showing a possible wayfinding route calculation scheme in accordance with a possible embodiment of the disclosure.

FIG. 12 is a diagram of an exemplary wayfinding screen 1200 on a low-cost display unit 150,160 showing a possible wayfinding route calculation scheme in accordance with a possible embodiment of the disclosure. The exemplary wayfinding screen 1200 may be used as a tool to show how a particular path is determined. The circle with the white background and black number in the circle identifies a specific "Location ID" 1210. The circle with the grey background and the red number in the circle identifies the "cost" or distance value 1220 between Location IDs 1210. The black lines that join the white circles are the defined/allowable connections 1230 between the Location IDs 1210 on the map. These lines are the basic allowable paths, for example. Using this information along with other information discussed above, the display control unit 355 can determine the path for the user to travel to his or her destination.

Embodiments within the scope of the present disclosed embodiments may also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures. When information may be transferred or provided over a network or another communications connection (either hardwired, wireless, or combination thereof) to a computer, the computer properly views the connection as a computer-readable medium. Thus, any such connection may be properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that may be executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosed embodiments may be part of the scope of the disclosed embodiments. For example, the principles of the disclosed embodiments may be applied to each individual user where each user may individually deploy such a system. This be enables each user to utilize the benefits of the disclosed embodiments even if any one of the large number of possible applications do not need the functionality described herein. In other words, there may be multiple instances of the disclosed system each processing the content in various possible ways. It does not necessarily need to be one system used by all end users. Accordingly, the appended claims and their legal equivalents should only define the disclosed embodiments, rather than any specific examples given.

What is claimed is:

1. A low-cost display unit that displays wayfinding information to a traveler in a public travel-related area, comprising:
   a communication interface that facilitates receiving of travel-related information;
   a machine-readable marking reader that determines the presence of a travel document having one or more machine readable markings, scans the one or more machine-readable markings, and decodes the scanned one or more machine-readable markings, wherein the one or more machine-readable markings contain encoded traveled-related information pertaining to the traveler; and
   a display control unit that receives the decoded one or more machine-readable marking, determines the traveler's destination in the public travel-related area from the decoded one or more machine-readable markings, determines the path that the traveler should travel to reach the destination, and displays the determined path to the traveler on the low-cost display unit.

2. The low-cost display unit of claim 1, wherein the display control unit receives travel-related information through the communication interface, wherein the travel-related information includes at least one of the traveler's arrival information, departure information, gate assignment information, baggage claim area information, destination weather information, subway schedule information, terminal maps, station maps, location maps, advertisements, paging information, emergency information, and current time and date information on the low-cost display unit, and displays the travel-related information along with the determined path to the traveler on the low-cost display unit.

3. The low-cost display unit of claim 2, wherein the travel-related information is received by the display control unit wirelessly.

4. The low-cost display unit of claim 1, wherein the determined path is displayed to the traveler on a map of at least a portion of the public travel-related area.

5. The low-cost display unit of claim 1, wherein the display control unit determines the path using at least one of the travel distance of possible paths to the determined destination, a length of time of clearing one or more security checkpoints, and a predetermined walking speed.

6. The low-cost display unit of claim 1, wherein the public travel-related area is one of an airport terminal, a train station, a bus terminal, a restaurant, a rental car location, a hotel, a hotel shuttle bus, and a rental car shuttle bus.

7. The low-cost display unit of claim 1, wherein the low-cost display unit is controlled by a remote control unit in close proximity the low-cost display unit.

8. The low-cost display unit of claim 1, wherein the one or more machine readable markings are at least one of a barcode, a two-dimensional barcode, a three-dimensional barcode, and a data glyph.

9. The low-cost display unit of claim 1, wherein the determined path is displayed on one of a personal digital assistant (PDA), mobile communication device, personal computer, and mobile tablet processing device.

10. The low-cost display unit of claim 1, wherein the display control unit displays a length of time of clearing one or more security checkpoints on the low-cost display unit.

11. The low-cost display unit of claim 1, wherein the low-cost display unit is part of a display bank having a plurality of low-cost display units.

12. A method of displaying wayfinding information to a traveler in a public travel-related area on a low-cost display unit, comprising:
   determining the presence of a travel document having one or more machine readable markings;
   scanning the one or more machine-readable markings;
   decoding the scanned one or more machine-readable markings, wherein the one or more machine-readable markings contain encoded traveled-related information pertaining to the traveler; and
   determining the traveler's destination in the public travel-related area from the decoded one or more machine-readable markings;

determining the path that the traveler should travel to reach the destination; and displaying the determined path to the traveler on the low-cost display unit.

13. The method of claim 12, further comprising:

receiving travel-related information, wherein the travel-related information includes at least one of the traveler's arrival information, departure information, gate assignment information, baggage claim area information, destination weather information, subway schedule information, terminal maps, station maps, location maps, advertisements, paging information, emergency information, and current time and date information on the low-cost display unit; and displaying the travel-related information along with the determined path to the traveler on the low-cost display unit.

14. The method of claim 13, wherein the additional travel-related information is received by the low-cost display unit wirelessly.

15. The method of claim 12, wherein the determined path is displayed to the traveler on a map of at least a portion of the public travel-related area.

16. The method of claim 12, wherein the path is determined using at least one of the travel distance of possible paths to the determined destination, a length of time of clearing one or more security checkpoints, and a predetermined walking speed.

17. The method of claim 12, wherein the public travel-related area is one of an airport terminal, a train station, a bus terminal, a restaurant, a rental car location, a hotel, a hotel shuttle bus, and a rental car shuttle bus.

18. The method of claim 12, wherein the low-cost display unit is controlled by a remote control unit in close proximity the low-cost display unit.

19. The method of claim 12, wherein the one or more machine readable markings are at least one of a barcode, a two-dimensional barcode, a three-dimensional barcode, and a data glyph.

20. The method of claim 12, wherein the determined path is displayed on one of a personal digital assistant (PDA), mobile communication device, personal computer, and mobile tablet processing device.

21. The method of claim 12, further comprising:

displaying a length of time of clearing one or more security checkpoints on the low-cost display unit.

22. The low-cost display unit of claim 12, wherein the low-cost display unit is part of a display bank having a plurality of low-cost display units.

23. A computer-readable medium storing instructions for controlling a computing device for displaying wayfinding information to a traveler in a public travel-related area on a low-cost display unit, the instructions comprising:

determining the presence of a travel document having one or more machine readable markings;

scanning the one or more machine-readable markings;

decoding the scanned one or more machine-readable markings, wherein the one or more machine-readable markings contain encoded traveled-related information pertaining to the traveler; and determining the traveler's destination in the public travel-related area from the decoded one or more machine-readable markings;

determining the path that the traveler should travel to reach the destination; and displaying the determined path to the traveler on the low-cost display unit.

* * * * *